United States Patent
Marks et al.

(10) Patent No.: US 10,902,593 B2
(45) Date of Patent: Jan. 26, 2021

(54) METHODS AND APPARATUS FOR EXTENDED DYNAMIC RANGE FROM SINGLE EXPOSURES IN CAPILLARY ELECTROPHORESIS

(71) Applicant: LIFE TECHNOLOGIES CORPORATION, Carlsbad, CA (US)

(72) Inventors: Jeffrey Marks, Mountain View, CA (US); David Woo, Foster City, CA (US); Wallace George, Oakland, CA (US)

(73) Assignee: Life Technologies Corporation, Carlsbad, CA (US)

(*) Notice: Subject to any disclaimer, the term of this patent is extended or adjusted under 35 U.S.C. 154(b) by 0 days.

(21) Appl. No.: 16/557,376

(22) Filed: Aug. 30, 2019

(65) Prior Publication Data
US 2020/0074624 A1    Mar. 5, 2020

Related U.S. Application Data

(60) Provisional application No. 62/726,041, filed on Aug. 31, 2018.

(51) Int. Cl.
| | |
|---|---|
| *G06T 7/00* | (2017.01) |
| *H04N 5/372* | (2011.01) |
| *H04N 5/347* | (2011.01) |
| *G01N 27/447* | (2006.01) |

(52) U.S. Cl.
CPC ..... *G06T 7/0012* (2013.01); *G01N 27/44721* (2013.01); *H04N 5/347* (2013.01); *H04N 5/372* (2013.01)

(58) Field of Classification Search
CPC ........ G01N 27/44704; G01N 27/44721; G06T 7/0012; H04N 5/347; H04N 5/372
See application file for complete search history.

(56) References Cited

U.S. PATENT DOCUMENTS

| | | | |
|---|---|---|---|
| 5,904,822 A | 5/1999 | Casavant | |
| 6,863,791 B1* | 3/2005 | Liu | ..... G06K 9/00127 204/452 |
| 9,809,849 B2 | 11/2017 | Marks | |
| 2008/0036893 A1* | 2/2008 | De Godzinsky | ..... H04N 3/1562 348/311 |
| 2020/0003728 A1* | 1/2020 | Majumdar | ....... G01N 27/44721 |

FOREIGN PATENT DOCUMENTS

| | | |
|---|---|---|
| WO | WO-2007119067 A1 | 10/2007 |
| WO | WO-2018151843 A2 | 8/2018 |

OTHER PUBLICATIONS

PCT/US2019/049132, Search Report, dated Nov. 20, 2019.

* cited by examiner

*Primary Examiner* — Joon Kwon
(74) *Attorney, Agent, or Firm* — François A. Pelaez

(57) ABSTRACT

A biological analysis system and an associated method are provided. The method is used for recovering off scale data in an image produced by a camera in a capillary electrophoresis instrument. The method comprises the steps of identifying bins of the image where electron counts exceed a maximum number of counts; setting an off-scale flag for the identified bins; and processing the image to obtain a recovered dye signal, based on the flag set for each bin, and using a dye matrix.

6 Claims, 15 Drawing Sheets

METHODS AND APPARATUS FOR EXTENDED DYNAMIC RANGE FROM SINGLE EXPOSURES IN CAPILLARY ELECTROPHORESIS

CROSS-REFERENCE TO RELATED APPLICATIONS

This application claims the benefit of priority to U.S. Provisional Patent Application No. 62/726,041, filed Aug. 31, 2018, which disclosure is herein incorporated by reference in its entirety.

FIELD

The present disclosure relates generally to systems, devices, and methods for observing, testing, and/or analyzing one or more biological samples, and more specifically to systems, devices, and methods for recovery of off-scale data in capillary electrophoresis analysis of dye-labeled biological samples.

BACKGROUND

Generally, there is a need to increasingly automate biological analysis systems to increase efficiency. For example, advances in automated biological sample processing instruments allow for quicker and more efficient analysis of samples. There is also an increasing need to provide biological analysis systems with designs that cater to user needs, such as ease of install, ease of use, minimal necessary lab space.

Instruments that analyze dye-labeled samples generally analyze the results of sample runs. However, problems with run conditions that might make the resulting data not reliable are generally not identified, or are identified so late that samples and time are wasted, thereby lengthening the research process. Such instruments use a dye matrix to correlate incoming spectral data with the particular dyes usable with the instrument. The dye matrix identifies normalized expected values for each dye usable with the system. Existing instruments typically require that the normal runtime operation of the system, in which samples of interest are processed in the instrument, be supplemented by and/or interrupted to carry out a special calibration process that is typically performed by the end user. For example, such a process might require a special "calibration run" in which known dyes are run through the system and the resulting spectral data is used to calibrate or re-calibrate the dye matrix used by the system.

In addition, in capillary electrophoresis, it takes extra time and money for an operator to control the signal levels of their samples. They must control their signal levels in order to get accurate signals that have a good signal-to-noise, without saturating the detector, i.e. the camera. When the camera is saturated, with a conventional data analysis workflow, the dye signals that are measured are inaccurate. The main peak is distorted, and false peaks called "pull-up" are artificially created. One way the operator can control their signal levels is by quantitating their input biological sample such as, e.g., input DNA. The operator can measure the concentration of input DNA, then dilute said concentration if it is too high, both of which take extra time and add cost.

While a user can manually interpret data that is off-scale, this takes extra time. In their data analysis workflow, peaks that have saturated the camera are called "off-scale", and are flagged. Their data analysis workflow requires the user to visually inspect all flagged peaks.

There is therefore a need for an automated recovery of off-scale data that bypasses the additional steps of visual inspection of off-scale peaks and quantitating of input DNA.

SUMMARY

In an embodiment of the present teachings, a biological analysis system and an associated method are provided. The method is used for recovering off scale data in an image produced by a camera in a capillary electrophoresis instrument. The method comprises the steps of identifying bins of the image where the electron counts produce a signal greater than a maximum camera signal; setting an off-scale flag for the identified bins; and processing the image to obtain a recovered dye signal, based on the flag set for each bin, and using a dye matrix.

In another embodiment, the method further comprises changing a binning pattern of the camera, wherein the change comprises reducing the size of a bin corresponding to a peak for a given dye.

In yet another embodiment, the method further comprises setting to zero any coefficient of the dye matrix corresponding to bins that have been flagged as off-scale; calculating a modified pseudoinverse dye matrix; and calculating the recovered dye signal using the modified pseudoinverse dye matrix.

Additional aspects, features, and advantages of the present invention are set forth in the following description and claims, particularly when considered in conjunction with the accompanying drawings in which like parts bear like reference numbers.

DETAILED DESCRIPTION

The following description provides embodiments of the present invention, which are generally directed to systems, devices, and methods for preparing, observing, testing, and/or analyzing biological samples. Such description is not intended to limit the scope of the present invention, but merely to provide a description of embodiments.

Exemplary System Overview

Figure 1:
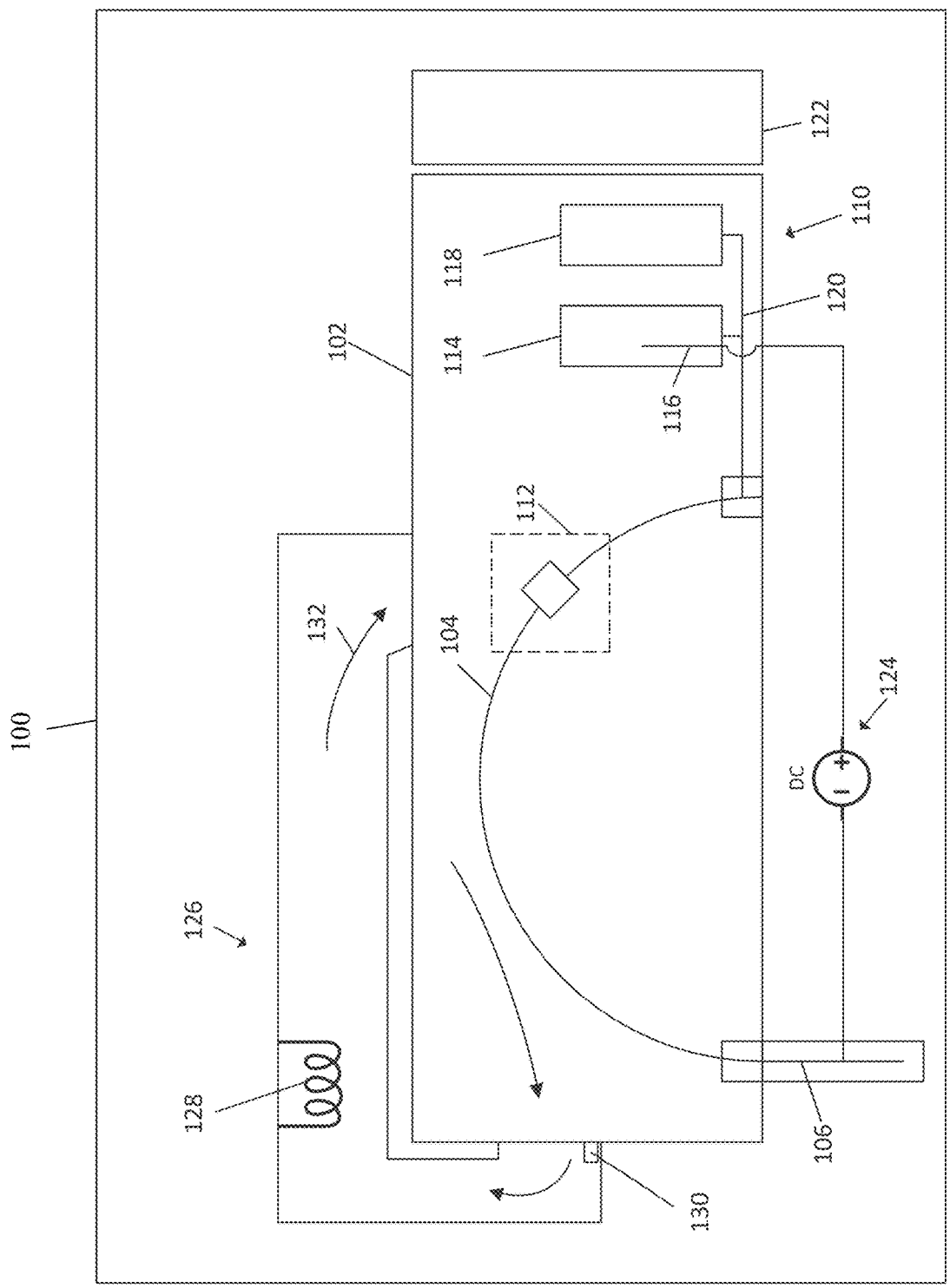
FIG. 1 is a block diagram that illustrates an exemplary instrument system, upon which embodiments of the present teachings may be implemented.

FIG. 1 depicts a schematic view of a biological analysis device 100 according to an exemplary embodiment of the disclosure. The biological analysis device 100 is configured to perform capillary electrophoresis and includes a cartridge 102 that is configured to be easily replaceable by a user (e.g., operator or other personnel) of the biological analysis device 100. The cartridge 102 combines various elements of the biological analysis device within a multi-function, integrated, easily replaceable unit. For example, the cartridge 102 includes one or more capillaries 104 (only one depicted in FIG. 1), one or more cathodes 106 coupled with a cathode end of the one or more capillaries 104, and a fluidics section 110. The cartridge 102 also includes a detection section 112 including various components configured to interface with an optical detection system (not shown) of the biological analysis device 100.

The fluidics section 110 includes one or more storage devices (e.g., reservoirs, containers) that contain a separation medium (e.g., a polymer gel) and a buffer. In the exemplary embodiment of FIG. 1, the fluidics section 110 includes a buffer reservoir 114 and a separation medium container 118. The fluidics section 110 further includes a manifold 120 configured to fluidically couple the buffer reservoir 114 and the separation medium container 118 with an anode end of the one or more capillaries 104. The manifold 120 may include one or more valves and one or more fluid transfer devices, for example.

The biological analysis device 100 includes an actuation section 122 configured to interface with the fluidics section 110. For example, the actuation section 122 may be configured to actuate one or more fluid control devices, such as one or more valves and/or fluid transfer devices of the fluidics section 110.

The biological analysis device 100 includes a voltage section 124 configured to generate a voltage potential between the cathode 106 and an anode 116 that is electrically coupled with a buffer contained in the buffer reservoir 114. In use, the one or more capillaries are filled with the polymer separation medium, and an electrically conductive fluid connection is established between the one or more capillaries 104 and the anode 116 through the buffer. A voltage differential is applied between the cathode 106, which is also submerged in a buffer, and the anode 116. As one having ordinary skill in the art would be familiar with, the voltage differential causes charged analytes to migrate through the one or more capillaries 104, which are filled with the separation medium, where the analytes separate and are detected in the detection section 112 using the optical detector device of the biological analysis device 100.

The biological analysis device 100 further includes a temperature regulation section 126 that regulates the temperature of the one or more capillaries 104. The temperature regulation section 126 is configured to mate with the cartridge 102 and includes a heating element 128, a temperature sensor (e.g., a thermistor) 130, and an air movement device (not shown) that generates a flow of warmed air 132 through the cartridge 102 to maintain the temperature of the one or more capillaries 104 at a desired value.

The components associated with the user-replaceable cartridge 102 may be housed in a cartridge housing, and the cartridge housing may include one or more features configured to interface with features of the biological analysis device 100. For example, various features of the cartridge 102 may interface with features of the biological analysis device 100 to ensure correct positioning and alignment of the cartridge 102, and its associated components, and to enable the biological analysis device 100 to actuate components of the fluidics section 110. Further interfacing features enable the cartridge 102 to interface with the temperature regulation section 126 and the voltage section 124.

The interface between the cartridge 102 and the biological analysis device 100, and the particular division of functional components between the cartridge 102 and the biological analysis device 100 may be configured and selected to facilitate use and reliable operation of the biological analysis device. For example, the configuration of the biological analysis device 100 and cartridge 102 is chosen to mitigate, if not eliminate, failure modes due to user error.

Computer-Implemented System

Methods of in accordance with embodiments described herein, may be implemented in a computer system.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on non-transitory computer-readable media. Some other processes can be implemented using analog circuitry, as is well known to one of ordinary skill in the art. Additionally, memory or other storage, as well as communication components, may be employed in embodiments of the invention.

Figure 2:
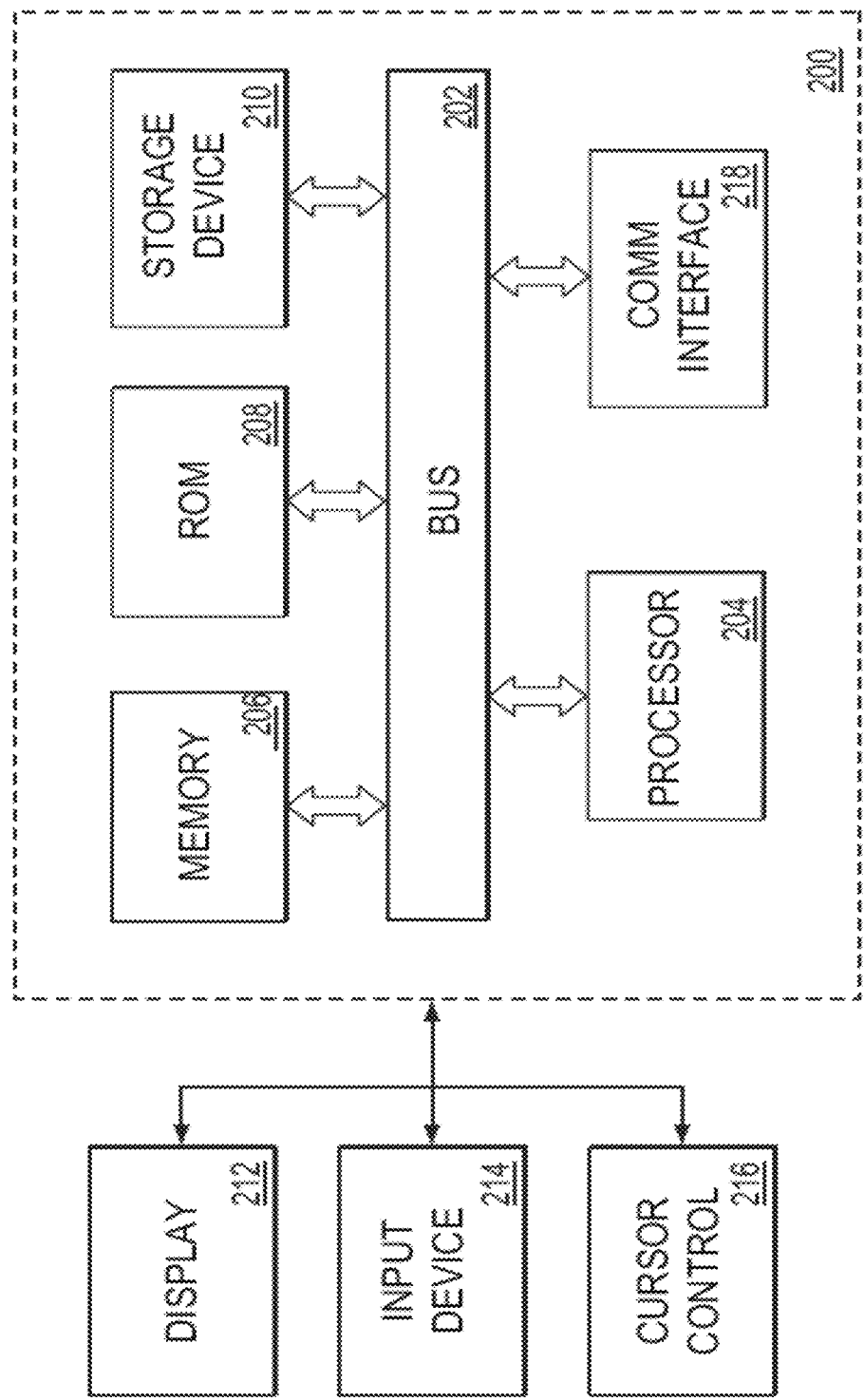
FIG. 2 is a block diagram that illustrates a computer system, upon which embodiments of the present teachings may be implemented.

FIG. 2 is a block diagram that illustrates a computer system 200 that may be employed to carry out processing functionality, according to various embodiments. Instruments to perform experiments may be connected to the exemplary computing system 200. According to various embodiments, the instruments that may be utilized include, for example, the biological analysis device 100 of FIG. 1. Computing system 200 can include one or more processors, such as a processor 204. Processor 204 can be implemented using a general or special purpose processing engine such as, for example, a microprocessor, controller or other control logic. Processor 204 can be connected to a bus 202 or other communication medium.

Referring to FIG. 2, a computer system 200 may provide control to the function of biological analysis device 100 in FIG. 1, as well as the user interface function. Additionally, computer system 200 of FIG. 2 may provide data processing, display and report preparation functions. All such instrument control functions may be dedicated locally to the biological analysis device. As such, computer system 200 can serve as control system to biological analysis device 100. Computer system 200 of FIG. 2 may also provide remote control of part or all of the control, analysis, and reporting functions.

Computing system 200 of FIG. 2 may also be embodied in any of a number of forms, such as a rack-mounted computer, mainframe, supercomputer, server, client, a desktop computer, a laptop computer, a tablet computer, handheld computing device (e.g., PDA, cell phone, smart phone, palmtop, etc.), cluster grid, netbook, embedded systems, or any other type of special or general purpose computing device as may be desirable or appropriate for a given application or environment. Additionally, a computing system 200 can include a conventional network system including a client/server environment and one or more database servers, or integration with LIS/LIMS infrastructure. A number of conventional network systems, including a local area network (LAN) or a wide area network (WAN), and including wireless and/or wired components, are known in the art. Additionally, client/server environments, database servers, and networks are well documented in the art. According to various embodiments described herein, computing system 200 may be configured to connect to one or more servers in a distributed network. Computing system 200 may receive information or updates from the distributed network. Computing system 200 may also transmit information to be stored within the distributed network that may be accessed by other clients connected to the distributed network.

Computing system 200 of FIG. 2 also includes a memory 206, which can be a random access memory (RAM) or other dynamic memory, coupled to bus 202 for storing instructions to be executed by processor 204. Memory 206 also may be used for storing temporary variables or other intermediate information during execution of instructions to be executed by processor 204.

Computing system 200 further includes a read only memory (ROM) 208 or other static storage device coupled to bus 202 for storing static information and instructions for processor 204.

Computing system 200 may also include a storage device 210, such as a magnetic disk, optical disk, or solid state drive (SSD) is provided and coupled to bus 202 for storing information and instructions. Storage device 210 may include a media drive and a removable storage interface. A media drive may include a drive or other mechanism to support fixed or removable storage media, such as a hard disk drive, a floppy disk drive, a magnetic tape drive, an optical disk drive, a CD or DVD drive (R or RW), flash drive, or other removable or fixed media drive. As these examples illustrate, the storage media may include a computer-readable storage medium having particular computer software, instructions, or data stored therein.

In alternative embodiments, storage device 210 may include other similar instrumentalities for allowing computer programs or other instructions or data to be loaded into computing system 200. Such instrumentalities may include, for example, a removable storage unit and an interface, such as a program cartridge and cartridge interface, a removable memory (for example, a flash memory or other removable memory module) and memory slot, and other removable storage units and interfaces that allow software and data to be transferred from the storage device 210 to computing system 200.

Computing system 200 of FIG. 2 can also include a communications interface 218. Communications interface 218 can be used to allow software and data to be transferred between computing system 200 and external devices. Examples of communications interface 218 can include a modem, a network interface (such as an Ethernet or other NIC card), a communications port (such as for example, a USB port, a RS-232C serial port), a PCMCIA slot and card, Bluetooth, etc. Software and data transferred via communications interface 218 are in the form of signals which can be electronic, electromagnetic, optical or other signals capable of being received by communications interface 218. These signals may be transmitted and received by communications interface 218 via a channel such as a wireless medium, wire or cable, fiber optics, or other communications medium. Some examples of a channel include a phone line, a cellular phone link, an RF link, a network interface, a local or wide area network, and other communications channels.

Computing system 200 may be coupled via bus 202 to a display 212, such as a cathode ray tube (CRT) or liquid crystal display (LCD), for displaying information to a computer user. An input device 214, including alphanumeric and other keys, is coupled to bus 202 for communicating information and command selections to processor 204, for example. An input device may also be a display, such as an LCD display, configured with touchscreen input capabilities. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane. A computing system 200 provides data processing and provides a level of confidence for such data. Consistent with certain implementations of embodiments of the present teachings, data processing and confidence values are provided by computing system 200 in response to processor 204 executing one or more sequences of one or more instructions contained in memory 206. Such instructions may be read into memory 206 from another computer-readable medium, such as storage device 210. Execution of the sequences of instructions contained in memory 206 causes processor 204 to perform the process states described herein. Alternatively, hard-wired circuitry may be used in place of or in combination with software instructions to implement embodiments of the present teachings. Thus, implementations of embodiments of the present teachings are not limited to any specific combination of hardware circuitry and software.

The term "computer-readable medium" and "computer program product" as used herein generally refers to any media that is involved in providing one or more sequences or one or more instructions to processor 204 for execution. Such instructions, generally referred to as "computer program code" (which may be grouped in the form of computer programs or other groupings), when executed, enable the computing system 200 to perform features or functions of embodiments of the present invention. These and other forms of non-transitory computer-readable media may take many forms, including but not limited to, non-volatile media, volatile media, and transmission media. Non-volatile media includes, for example, solid state, optical or magnetic disks, such as storage device 210. Volatile media includes dynamic memory, such as memory 206. Transmission media includes coaxial cables, copper wire, and fiber optics, including the wires that comprise bus 202.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on magnetic disk of a remote computer. The remote computer can load the instructions into its dynamic memory and send the instructions over a telephone line using a modem. A modem local to computing system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which processor 204 retrieves and executes the instructions. The instructions received by memory 206 may optionally be stored on storage device 210 either before or after execution by processor 204.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Raw Data

Figure 3:
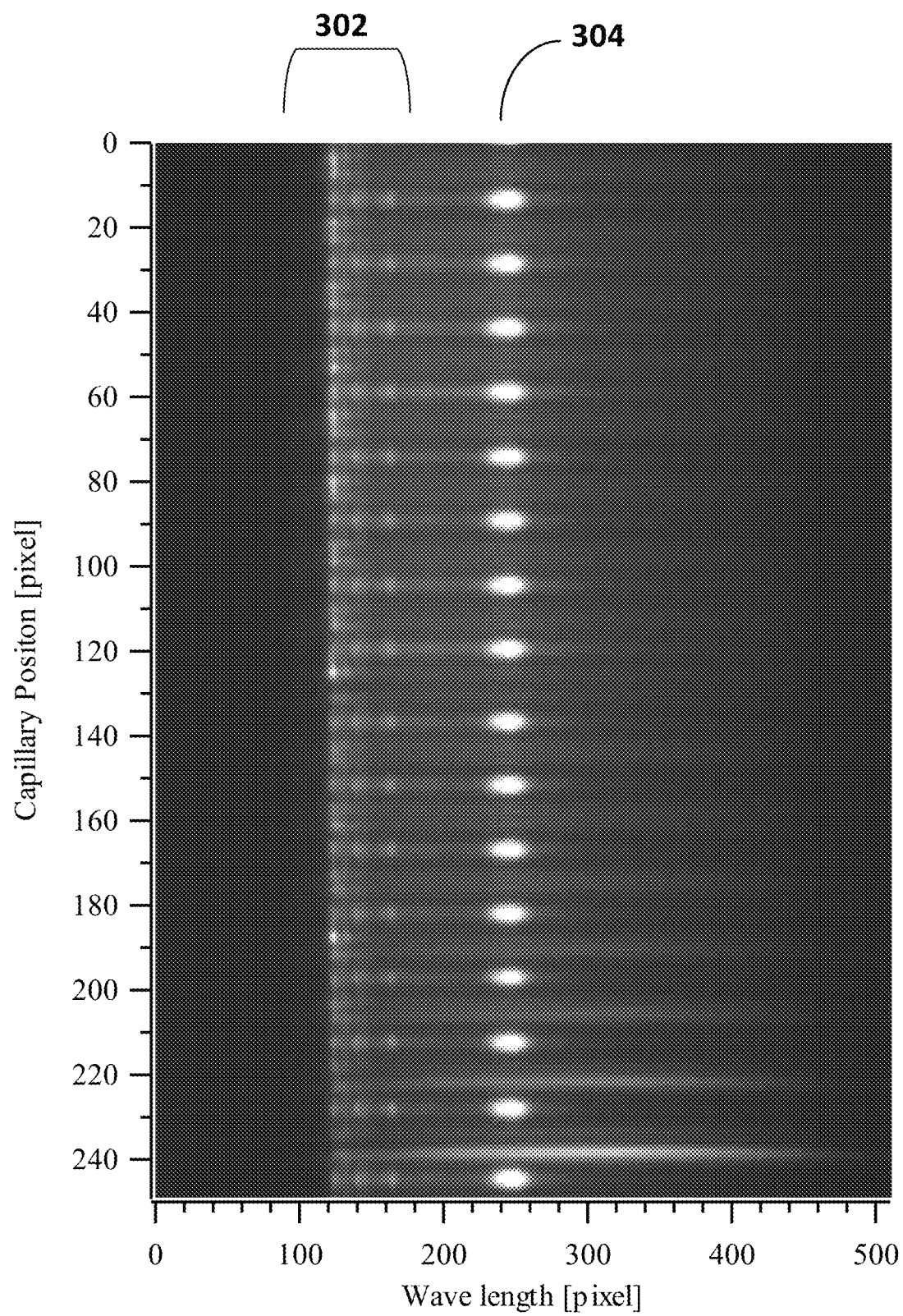
FIG. 3 is an example of a raw image, captured by a CCD camera, of 16 capillaries in an exemplary instrument system in accordance with one embodiment of the present teachings.

FIG. 3 depicts an example of a 16-capillary subset of a raw full frame image provided by a CCD camera of a biological analysis device. In this example, each capillary uses the data from three rows of the raw image along the vertical axis, measured in pixels. The horizontal axis corresponds to the wavelength of the detected signal, also measured in pixels.

One possible way to decrease the occurrence of off-scale data is to use narrower bins, thereby combining fewer of the original pixels in each bin. But narrowing the bins increases their number and therefore the time it takes to read a complete image.

Off-Scale Data

Figure 4:
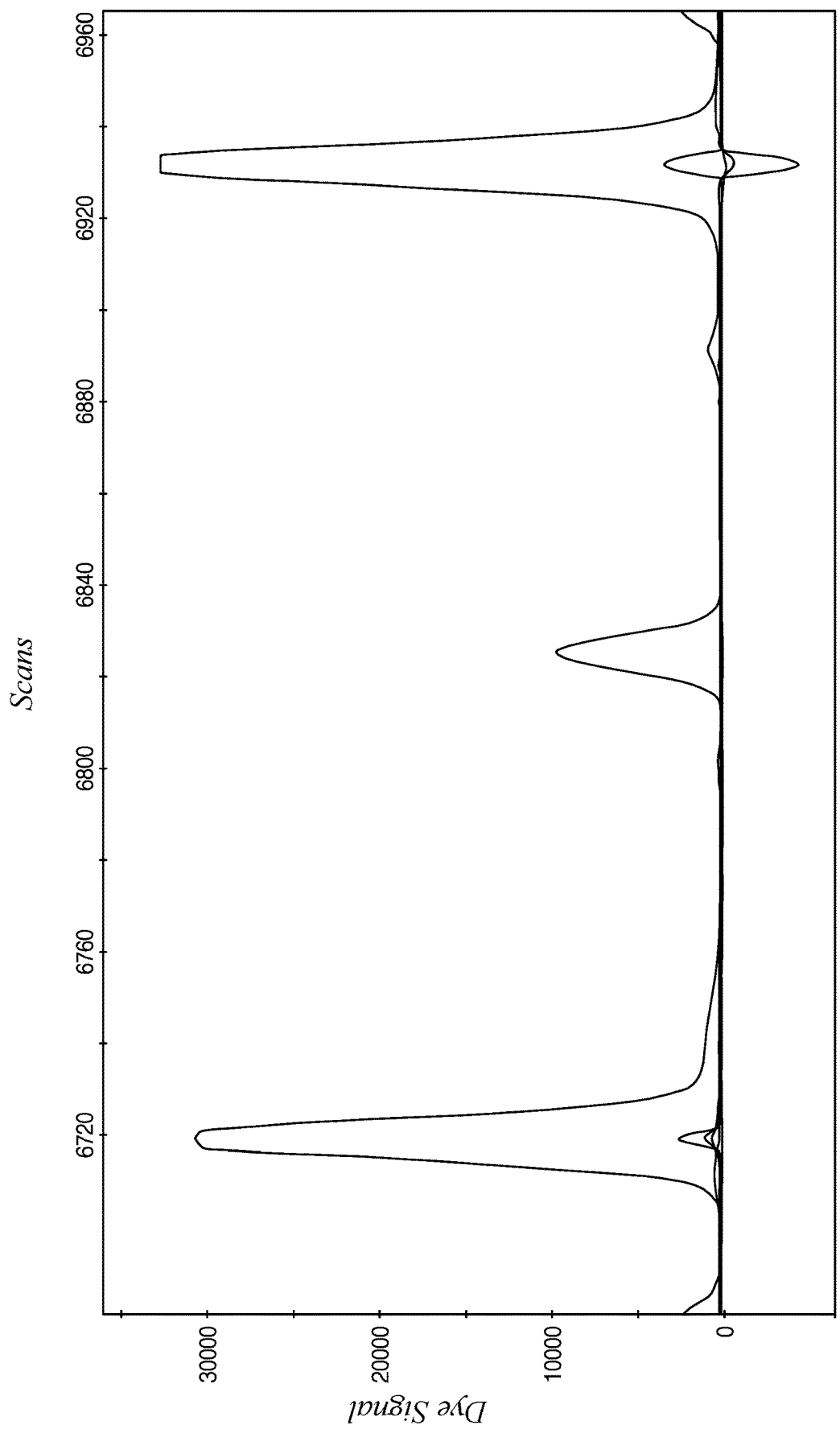
FIG. 4 is a graphic representation of an example of slightly off-scale dye data.

FIG. 4 shows an example of a high sample concentration making the data slightly off scale. Data that is off scale has distorted peaks in the main dye and false peaks in other dyes. The slightly off-scale data is recoverable with visual inspection, but requires operator intervention.

Figure 5:
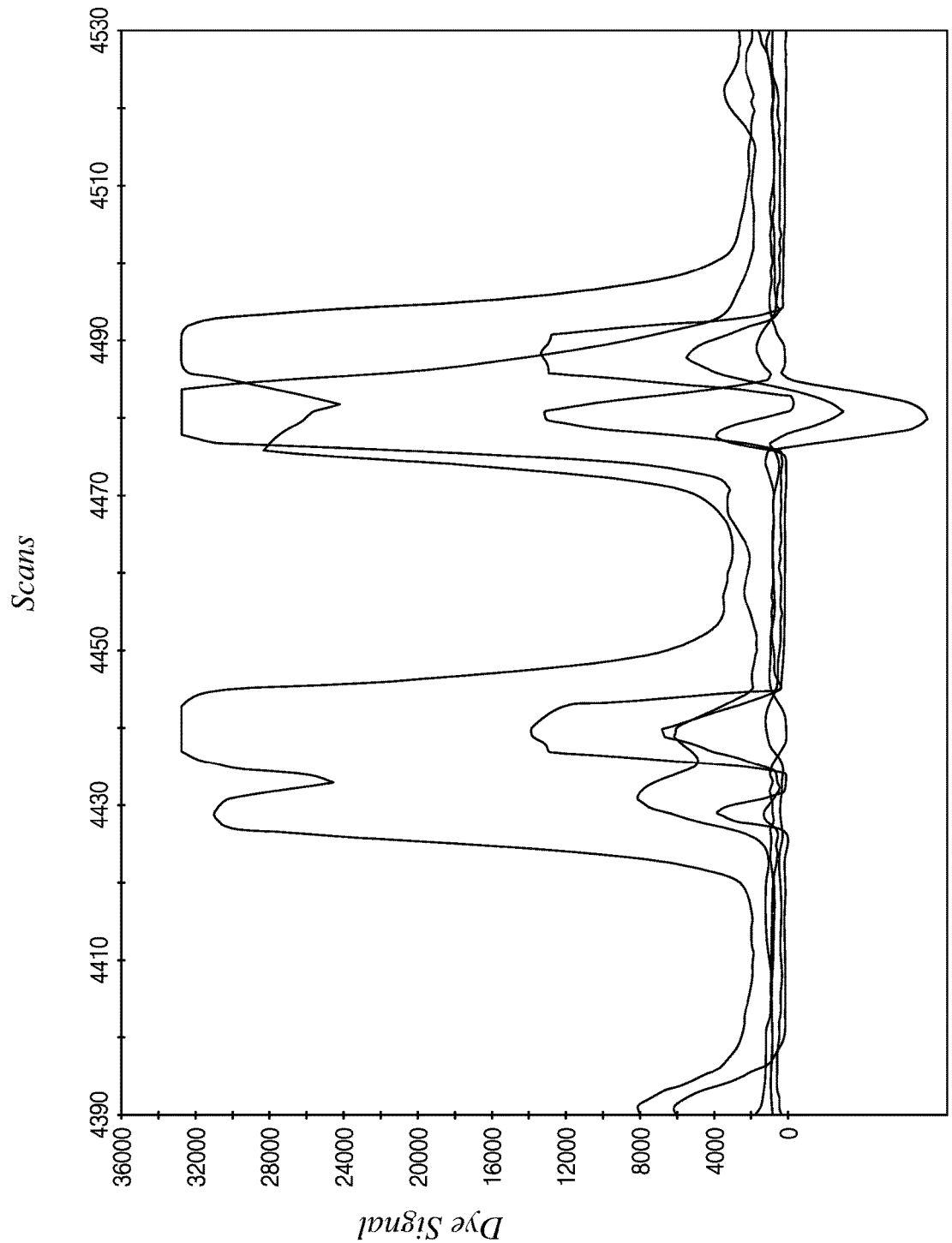
FIG. 5 is a graphic representation of an example of severely off-scale dye data.

FIG. 5 shows an example of a high sample concentration making the data severely off scale. This kind of severely off-scale data is not recoverable and necessitates a re-run with different parameters.

Figure 6:
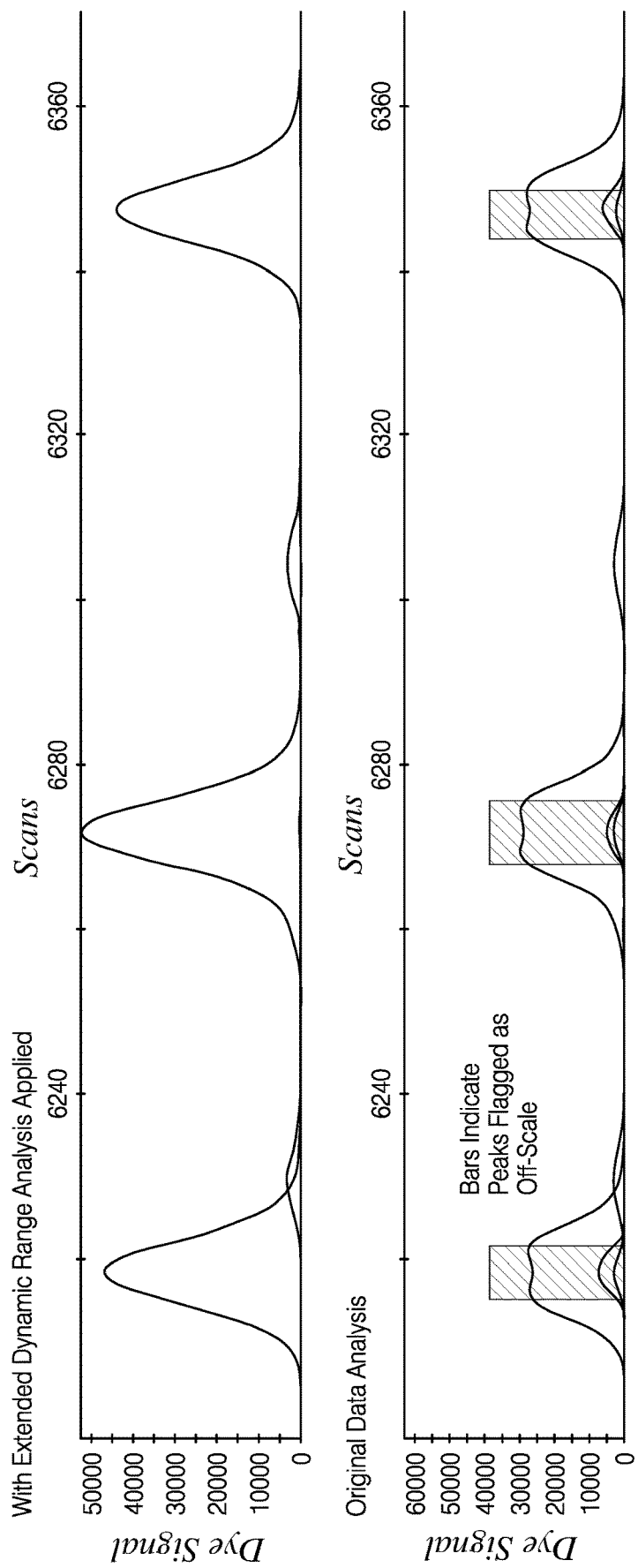
FIG. 6 illustrate a comparison between results obtained with a previous data analysis method and a method in accordance with one embodiment of the present teachings.

FIG. 6 shows a preliminary comparison between results obtained with a conventional method (lower plot—"Original Data Analysis") and a method in accordance with the present teachings (upper plot—"With Extended Dynamic Range Analysis applied").

Dye Matrix

Figure 7:
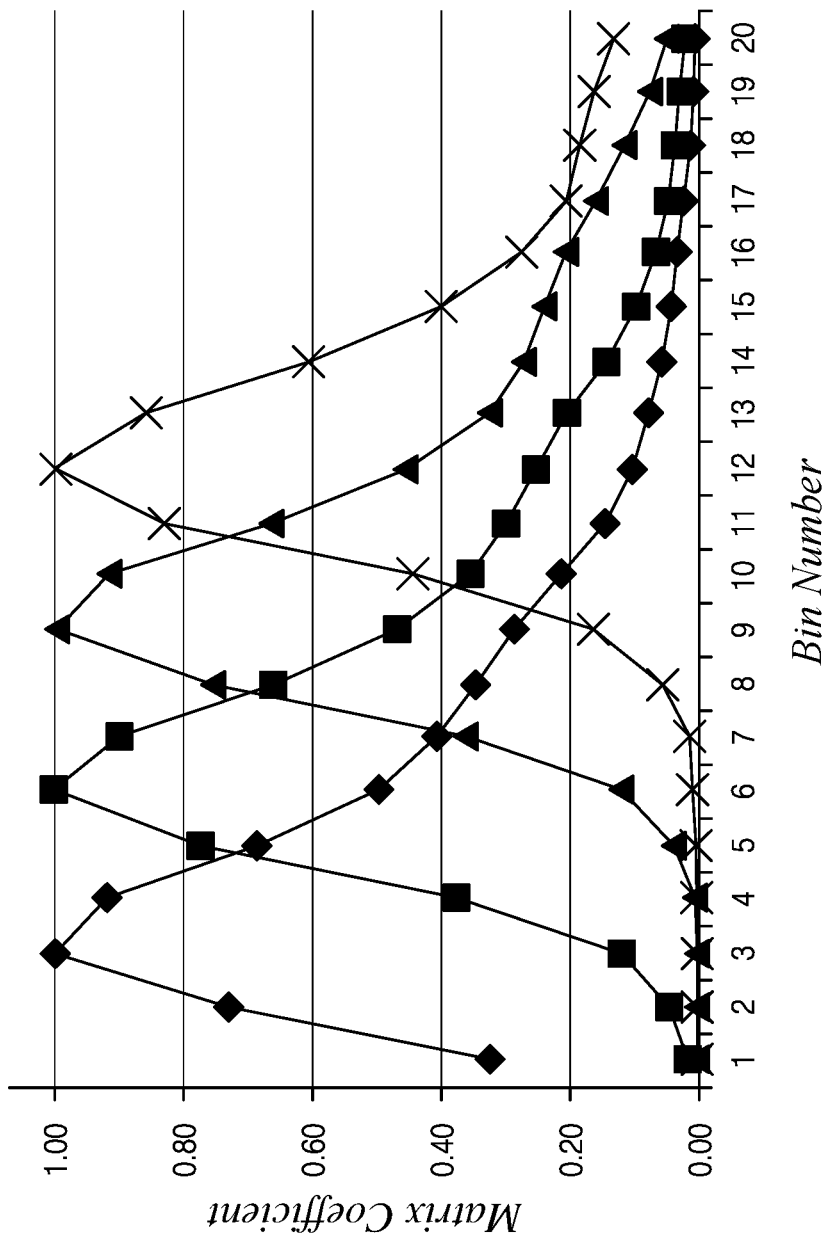
FIG. 7 illustrates an example of a dye matrix plotted as the response signal from each dye as a function of spectral bin.

A "Dye Matrix" is a response matrix used to recover dye data from the bin data. Each component in the dye matrix is the expected signal in each bin for one unit of each dye. FIG. 7 depicts a graphical representation of a dye matrix for four dyes over twenty bins. Each point represents the signal obtained in each bin for a unit of each dye. For instance, the left-most dye (represented by diamonds) reaches its maximum signal (1) in bin number 3, while the next dye (represented by squares) reaches its maximum in bin number 6. The dye matrix can also be represented by its coefficients, as shown in Table 1, where each row corresponds to a different dye:

TABLE 1

Dye matrix (DM) coefficients corresponding to the dye matrix shown in FIG. 7.

| 0.33 | 0.73 | 1.00 | 0.92 | 0.68 | 0.50 | 0.41 | 0.35 | 0.29 | 0.22 | 0.15 | 0.11 | 0.08 | 0.06 | 0.05 | 0.04 | 0.02 | 0.02 | 0.01 | 0.01 |
| 0.01 | 0.04 | 0.12 | 0.38 | 0.77 | 1.00 | 0.90 | 0.66 | 0.47 | 0.35 | 0.30 | 0.26 | 0.20 | 0.14 | 0.10 | 0.07 | 0.04 | 0.04 | 0.03 | 0.02 |
| 0.00 | 0.01 | 0.01 | 0.01 | 0.04 | 0.13 | 0.37 | 0.76 | 1.00 | 0.92 | 0.67 | 0.46 | 0.33 | 0.28 | 0.25 | 0.21 | 0.17 | 0.12 | 0.08 | 0.05 |
| 0.01 | 0.01 | 0.01 | 0.01 | 0.01 | 0.01 | 0.02 | 0.05 | 0.17 | 0.44 | 0.83 | 1.00 | 0.86 | 0.61 | 0.40 | 0.28 | 0.21 | 0.19 | 0.16 | 0.13 |

The bright spots 304 correspond to the Raman signal coming from the polymer alone, while the fainter spots 302 to the left correspond to the biological sample. The raw spectral data is typically binned into 20 bins on the CCD before it is sent to the computing system for analysis.

Camera Binning

The full frame of a CCD camera has usually too many columns of data to be read out in a timely manner, so multiple columns are combined into spectral "bins", each bin combining the electrons from one or more camera pixels. Bins can have uneven widths, which is referred to as "variable binning", to balance out the signals between different dyes.

The electrons from the CCD are thus combined together before they are read into a digital number between 0 and 65535. However, if there are too many electrons and their combined number is converted to a signal that exceeds the 65535 limit, the resulting measured signal will not be accurate. Such signal will be called "saturated" or "off-scale". One can therefore see that the binning can take data that was on-scale in the full image and make it off-scale because the combined signal in a bin is greater than 65535.

To recover the dye data from the bin data, one just needs to multiply the bin data vector by the pseudoinverse matrix of the dye matrix, i.e. $DM^+$ shown in Table 2:

[Dye Data]=[Bin Data]×[$DM^+$]

TABLE 2

$DM^+$ coefficients (Pseudoinverse Matrix of the dye matrix)

| 0.16 | −0.12 | 0.02 | 0.00 |
| 0.36 | −0.26 | 0.04 | 0.00 |
| 0.46 | −0.30 | 0.03 | 0.01 |
| 0.32 | −0.08 | −0.08 | 0.03 |
| 0.05 | 0.32 | −0.24 | 0.05 |
| −0.13 | 0.54 | −0.28 | 0.04 |
| −0.12 | 0.40 | −0.06 | −0.07 |
| −0.02 | 0.07 | 0.32 | −0.23 |
| 0.04 | −0.15 | 0.54 | −0.28 |
| 0.04 | −0.15 | 0.41 | −0.10 |
| 0.01 | −0.03 | 0.07 | 0.21 |
| −0.02 | 0.05 | −0.15 | 0.38 |
| −0.02 | 0.07 | −0.17 | 0.35 |
| −0.01 | 0.03 | −0.09 | 0.23 |
| 0.00 | −0.01 | −0.01 | 0.13 |

TABLE 2-continued

| DM+ coefficients (Pseudoinverse Matrix of the dye matrix) | | | |
|---|---|---|---|
| 0.01 | −0.03 | 0.03 | 0.07 |
| 0.01 | −0.03 | 0.03 | 0.05 |
| 0.00 | −0.01 | 0.00 | 0.06 |
| 0.00 | 0.00 | −0.01 | 0.06 |
| 0.00 | 0.00 | −0.02 | 0.05 |

Figure 8A:
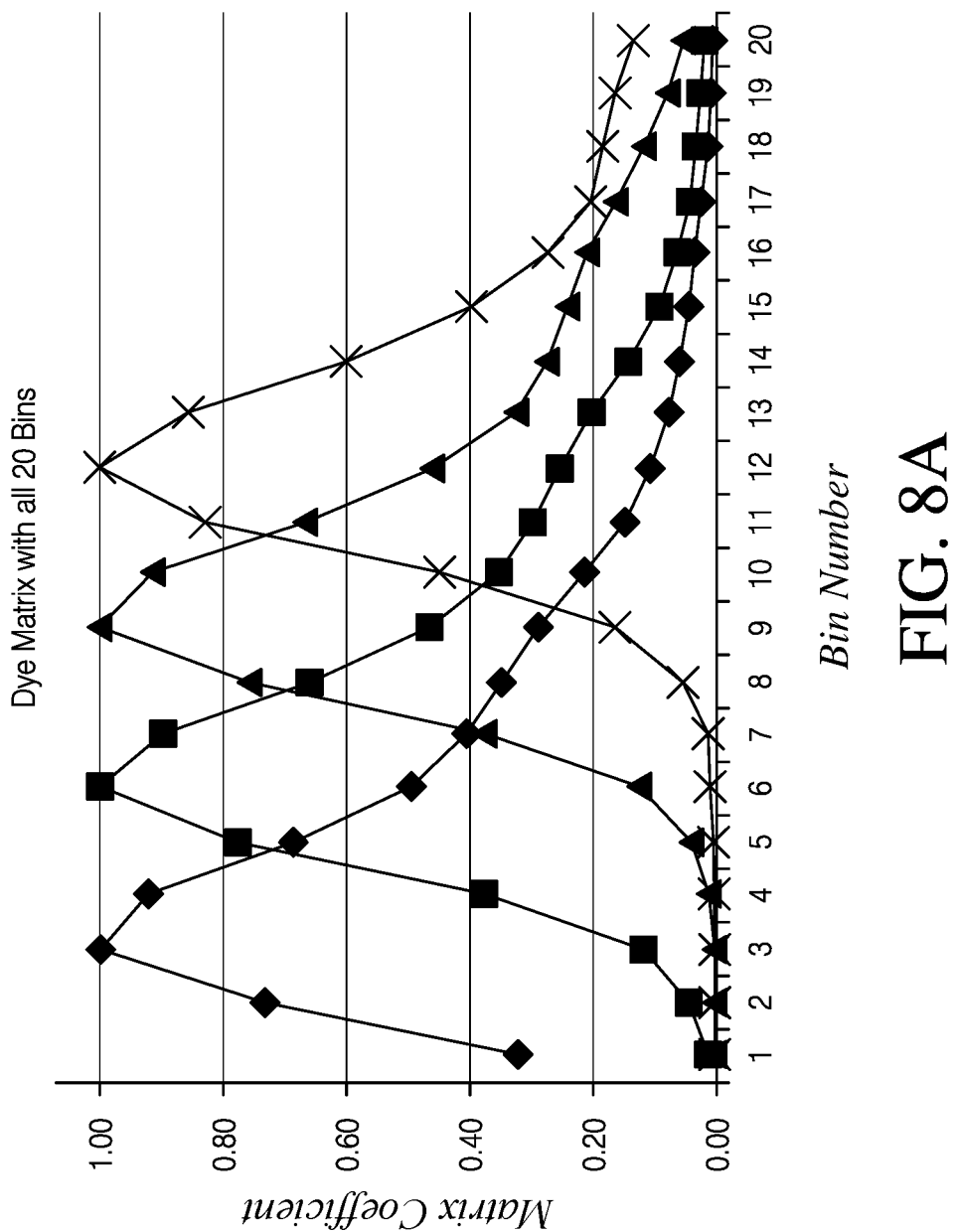
FIGS. 8a-8d illustrate a comparison between reconstructed dye signals obtained using a full dye matrix and a modified dye matrix.
Figure 8B:
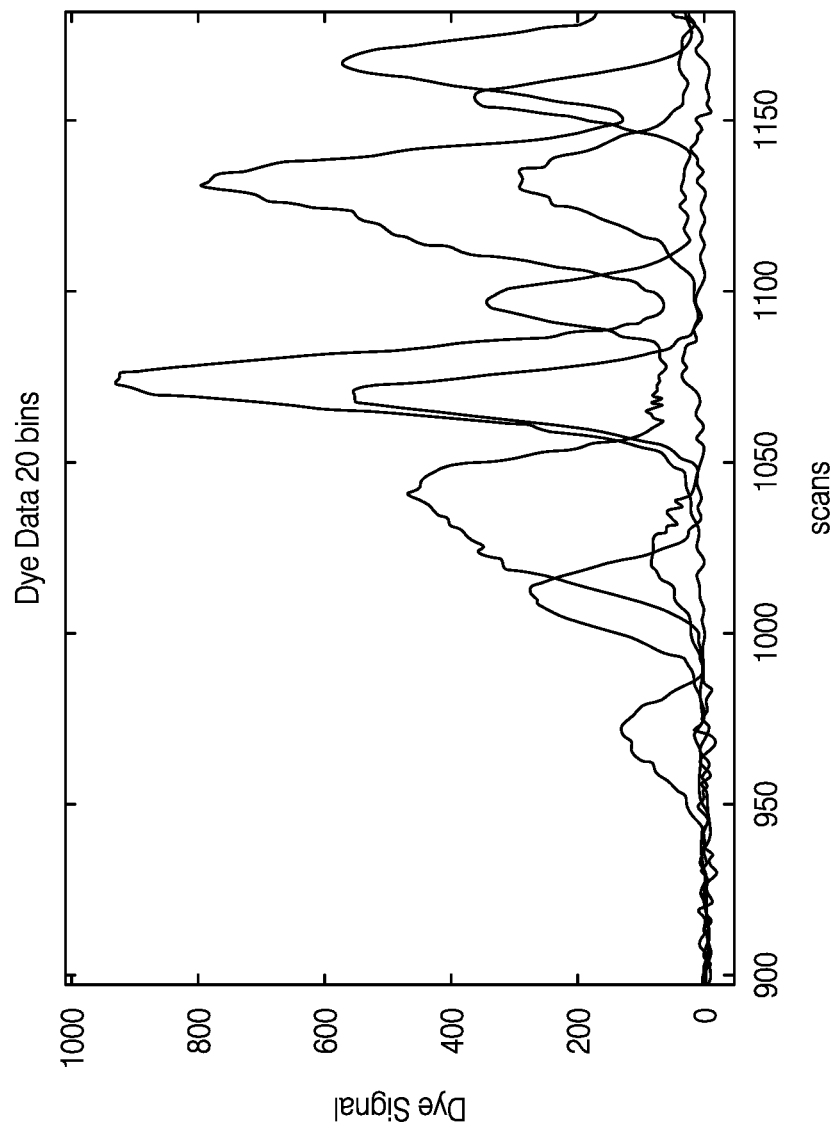
Figure 8C:
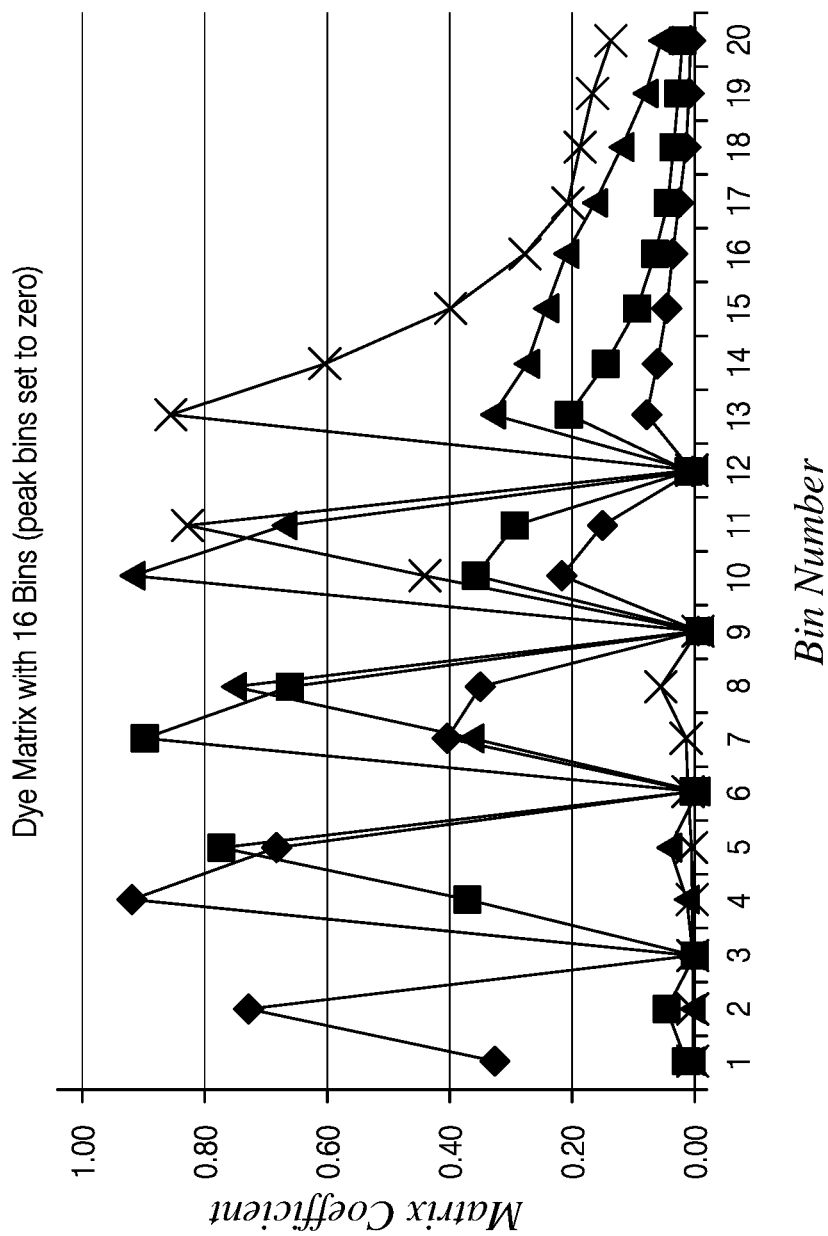
Figure 8D:
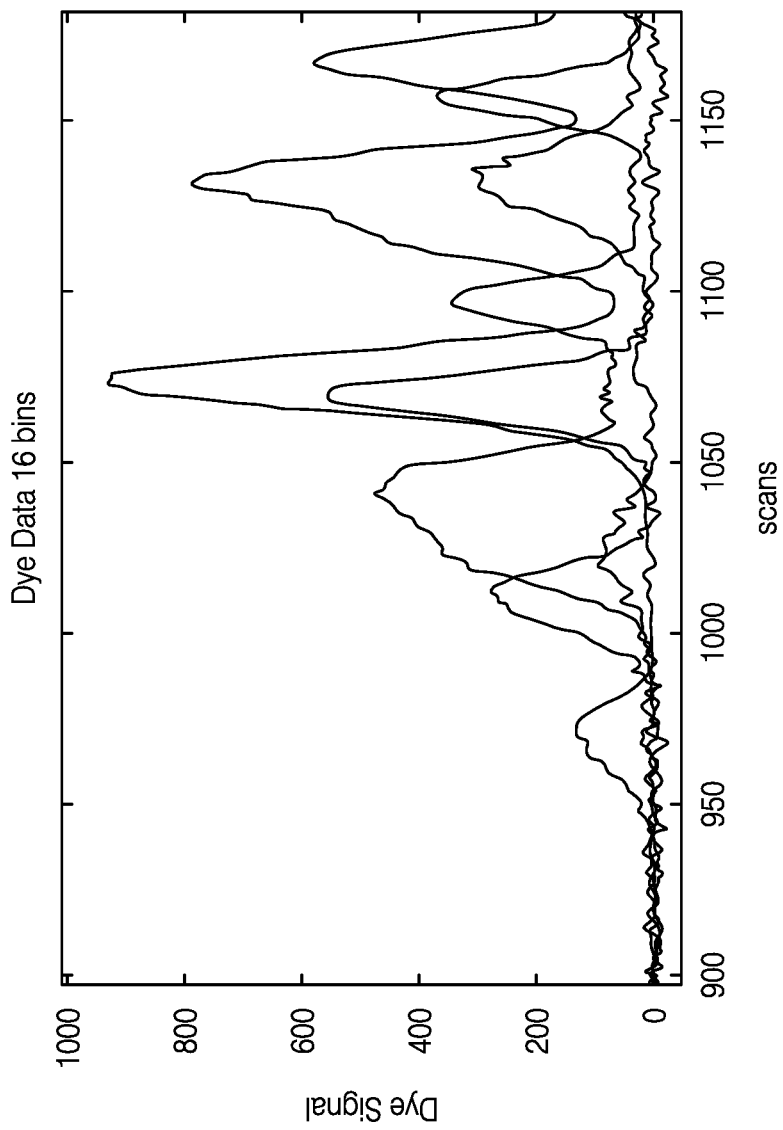

An interesting and unexpected property of the dye matrix is that, for a given dye, one will get the same reconstructed dye signal no matter which bin is used, provided that the proper component of the matrix is used to calculate the signal. This is illustrated in FIGS. 8a-8d, which show a comparison between reconstructed dye signals obtained by using, respectively, a full dye matrix (FIG. 8a) and a modified dye matrix (FIG. 8c). In this example, the full dye matrix corresponds to a response matrix for 4 dyes over 20 bins. In the modified dye matrix, the coefficients for bins 3, 6, 9 and 12 have been set to zero. The reconstructed dye signal obtained using the modified dye matrix (FIG. 8d) shows no significant difference when compared to the dye signal obtained with the full matrix (FIG. 8b).

Off-Scale Peak Recovery

Figure 9:
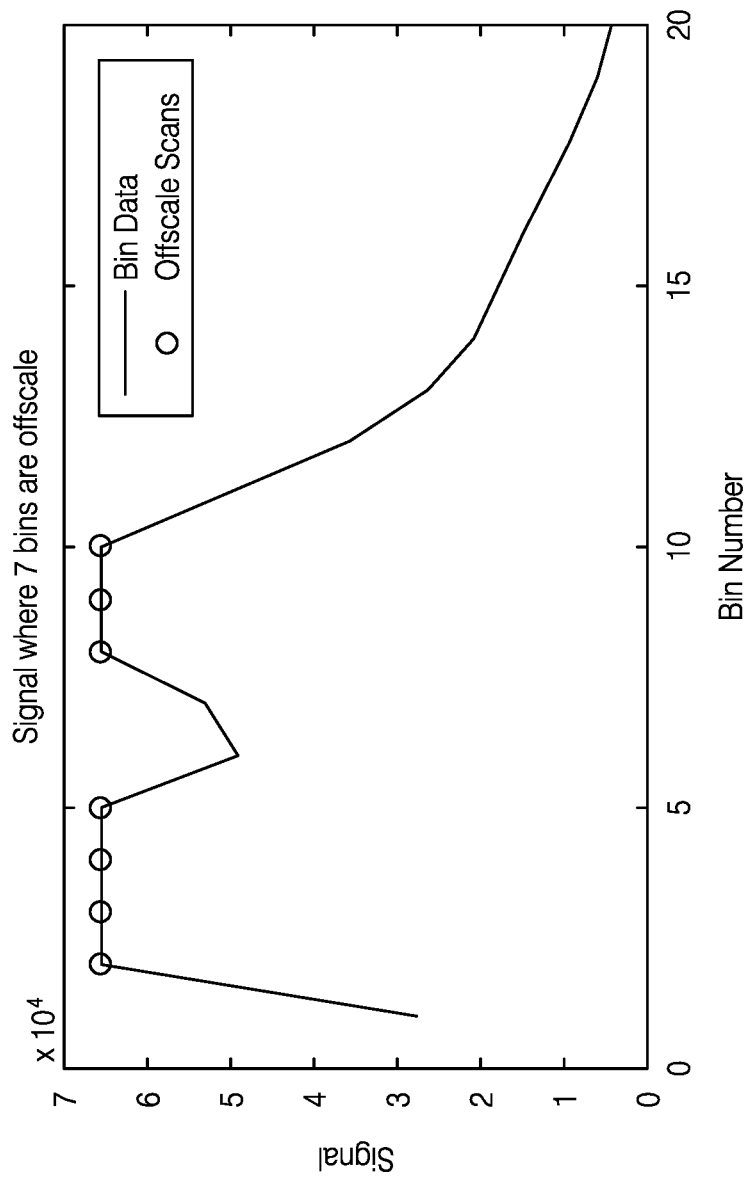
FIG. 9 illustrates an example of a saturated peak signal for a scan plotted as a function of bin number.

This property allows the recovery of off-scale peaks. FIG. 9 shows an example of a saturated peak signal for one scan plotted as a function of bin number. In this example, 7 bins have off-scale data, which means that the number of accumulated electrons exceeded the maximum number available to count them (typically, 65535).

Figure 10:
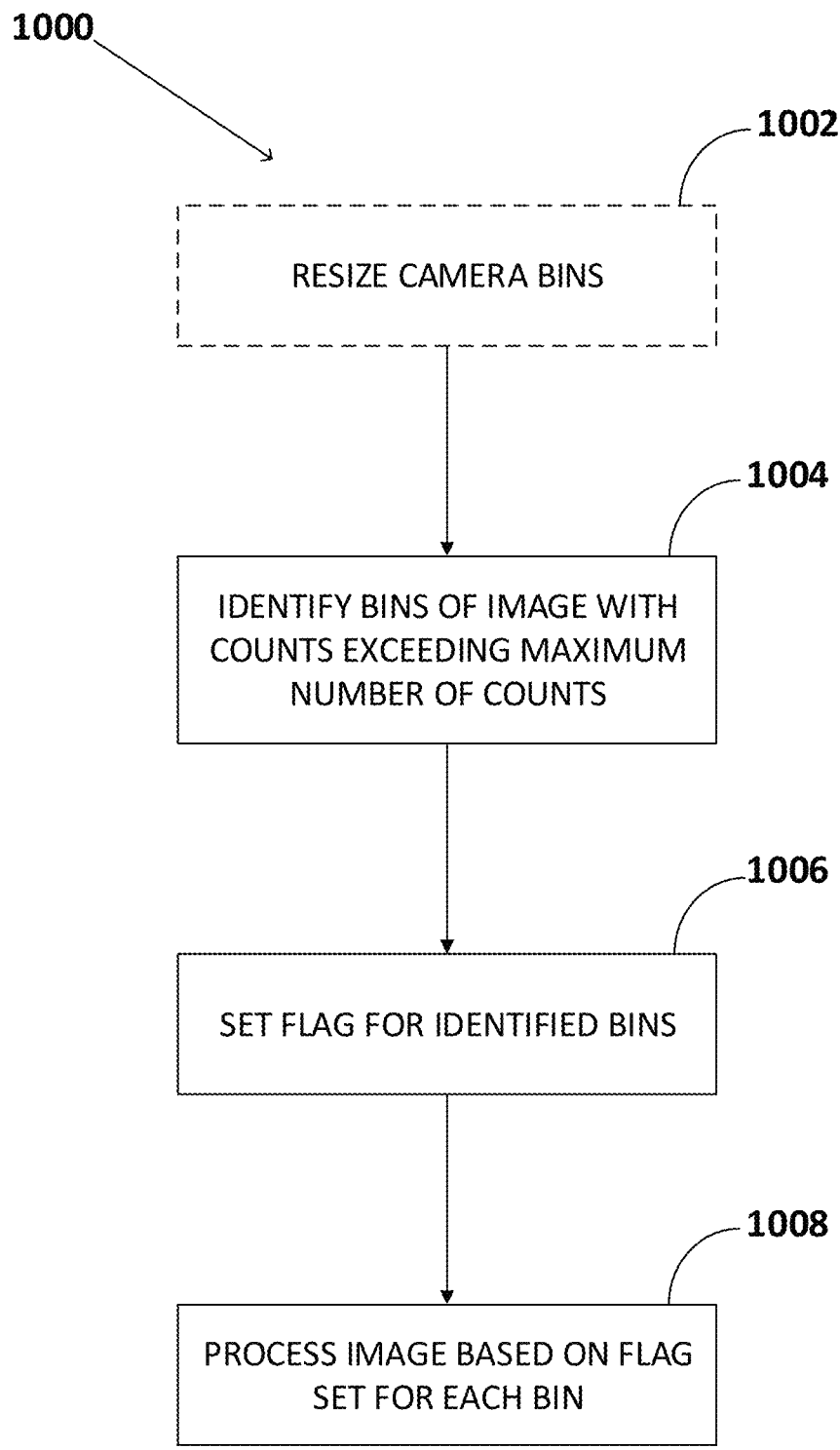
FIG. 10 illustrates a routine for recovering off scale data in a raw image in accordance with one embodiment of the present teachings.
Figure 11:
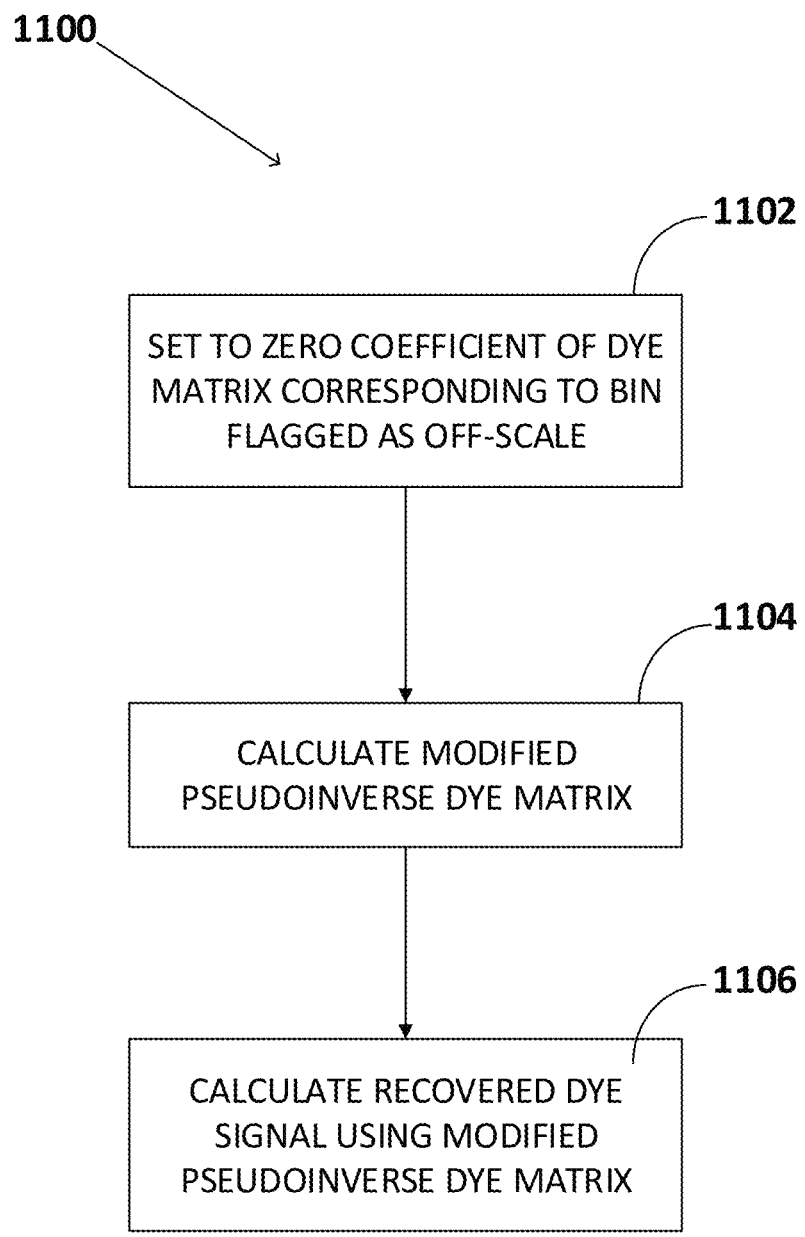
FIG. 11 illustrates further aspects of a routine for recovering off scale data in a raw image in accordance with one embodiment of the present teachings.

In one embodiment, the proposed recovery method, as shown in FIG. 10 and FIG. 11, starts with the identification (1004) and flagging (1006) of bins in which the count exceeds a maximum number of counts. The image is then processed (1008) taking these flags into account.

As a way to further improve the process, the binning pattern on the camera can be changed (1002) prior to image acquisition. This change can be made by physically changing the camera hardware. It can also be accomplished by configuring the camera through modification of its firmware, and it can also be made dynamically by setting parameters in the image acquisition software.

The processing of an image, in accordance with an embodiment of the present teachings is further described in FIG. 11. In a first step 1102, any coefficient of the dye matrix, corresponding to a bin that has been flagged as off-scale, is set to zero, thereby creating a modified dye matrix. Then, at step 1104, a modified pseudoinverse dye matrix is calculated using the modified dye matrix. A recovered dye signal is finally computed at step 1106, using the modified pseudoinverse dye matrix.

Figure 12:
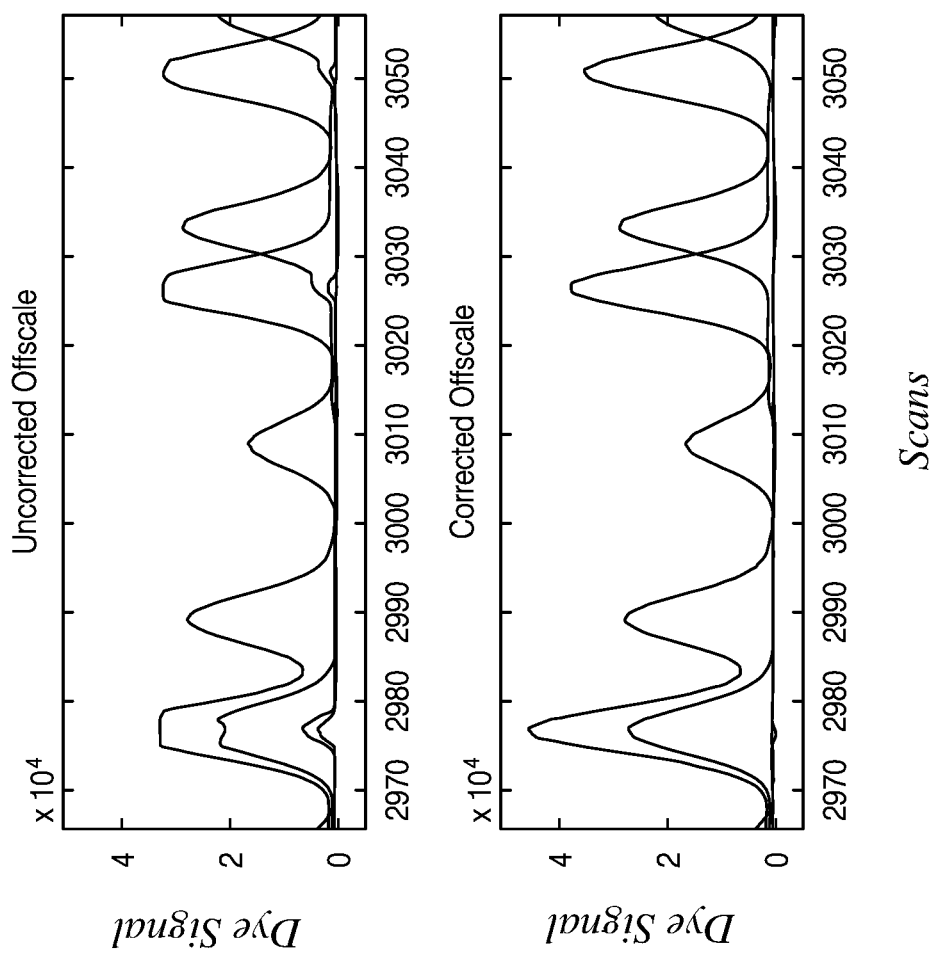
FIG. 12 illustrates results obtained with a method in accordance with one embodiment of the present teachings.

FIG. 12 shows the results obtained with the method described above. The upper plot shows uncorrected data, in which off-scale peaks produce pull-up and pull-down peaks. The lower plot shows corrected results, in which the elimination of off-scale bins yields recovered dye signals for each dye. In particular, the off-scale peaks recover their true height, and the artificial pull-up and pull-down peaks are eliminated.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for recovering off scale data in an image produced by a camera in a capillary electrophoresis instrument, the method comprising:
    identifying bins of the image where electron counts produce a signal greater than a maximum camera signal;
    setting an off-scale flag for the identified bins; and
    processing the image to obtain a recovered dye signal, based on the flag set for each bin, and using a dye matrix, wherein processing the image further comprises:
        setting to zero any coefficient of the dye matrix corresponding to bins that have been flagged as off-scale;
        calculating a modified pseudoinverse dye matrix; and
        calculating the recovered dye signal using the modified pseudoinverse dye matrix.

2. The method of claim 1, further comprising:
    changing a binning pattern of the camera, wherein the changing comprises reducing a size of one or more camera bins.

3. A non-transitory computer-readable storage medium, the computer-readable storage medium including instructions that when executed by a computer, cause the computer to:
    identify bins of an image where electron counts produce a signal greater than a maximum camera signal;
    set an off-scale flag for the identified bins; and
    process the image to obtain a recovered dye signal, based on the flag set for each bin, and using a dye matrix, wherein the computer-readable storage medium further includes instructions that when executed by the computer, cause the computer to:
        set to zero any coefficient of the dye matrix corresponding to bins that have been flagged as off-scale;
        calculate a modified pseudoinverse dye matrix; and
        calculate the recovered dye signal using the modified pseudoinverse dye matrix.

4. The non-transitory computer-readable storage medium of claim 3, wherein the computer-readable storage medium further includes instructions that when executed by the computer, cause the computer to change a binning pattern of the camera, wherein the change comprises reducing a size of one or more camera bins.

5. A biological analysis device for performing capillary electrophoresis, comprising:
    a camera configured to detect emission from a sample and produce an image;
    a processor; and
    a memory storing instructions that, when executed by the processor, configure the device to:
        identify bins of the image where electron counts produce a signal greater than a maximum camera signal;
        set an off-scale flag for the identified bins; and
        process the image to obtain a recovered dye signal, based on the flag set for each bin, and using a dye matrix, wherein the instructions stored in the memory further configure the device to:
            set to zero any coefficient of the dye matrix corresponding to bins that have been flagged as off-scale;
            calculate a modified pseudoinverse dye matrix; and
            calculate the recovered dye signal using the modified pseudoinverse dye matrix.

6. The biological analysis device of claim 5, wherein the instructions stored in the memory further configure the device to change a binning pattern of the camera, wherein the change comprises reducing a size of one or more camera bins.

* * * * *